United States Patent [19]

Deneen

[11] 4,019,659
[45] Apr. 26, 1977

[54] SOLIDS LEVEL INDICATOR

[76] Inventor: William F. Deneen, 306 E. Forest St., Marengo, Ill. 60152

[22] Filed: May 21, 1975

[21] Appl. No.: 579,852

[52] U.S. Cl. .............................. 222/193; 73/322; 222/51
[51] Int. Cl.² ..................... B67D 5/22; B67D 5/54
[58] Field of Search ............... 73/322; 33/126.7 R, 33/126.7 A; 220/93; 222/56, 51, 193; 23/267 A, 267 E

[56] References Cited

UNITED STATES PATENTS

| | | | |
|---|---|---|---|
| 1,750,979 | 3/1930 | Webb | 220/93 X |
| 2,640,269 | 6/1953 | Seefluth | 33/126.7 A |
| 3,578,776 | 5/1971 | Schneider, Jr. et al. | 23/267 E |
| 3,630,083 | 12/1971 | Gorans | 73/322 X |
| 3,713,224 | 1/1973 | Bengoa | 33/126.7 A |
| 3,746,170 | 7/1973 | Bloom et al. | 23/267 E X |
| 3,768,104 | 10/1973 | Sanderson | 23/267 A X |
| 3,854,634 | 12/1974 | Hart | 222/193 |

*Primary Examiner*—Richard C. Queisser
*Assistant Examiner*—Daniel M. Yasich
*Attorney, Agent, or Firm*—Sherman & Shalloway

[57] ABSTRACT

A solids-level indicator for small dissolving tanks including a transparent pipe secured on the top of the tank and a gauge member slideable in the transparent pipe and having a pad resting on the upper surface of the solid material. The transparent pipe serves as the liquid inlet and the gauging member serves to guide the liquid along itself for distribution adjacent the pad.

5 Claims, 3 Drawing Figures

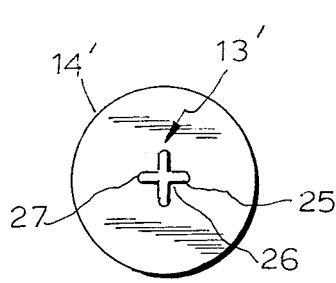
FIG.3
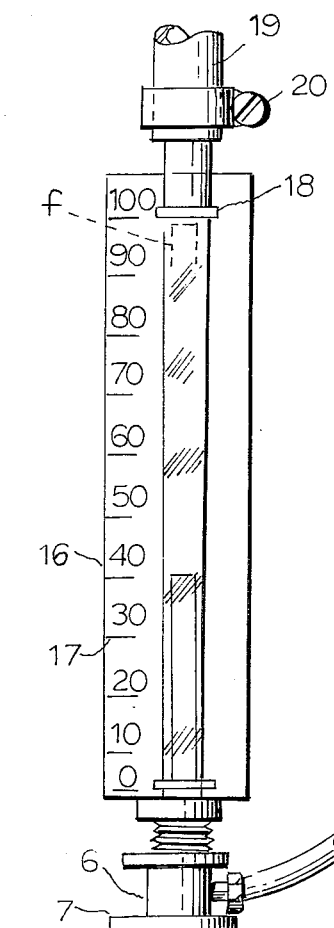
FIG.1
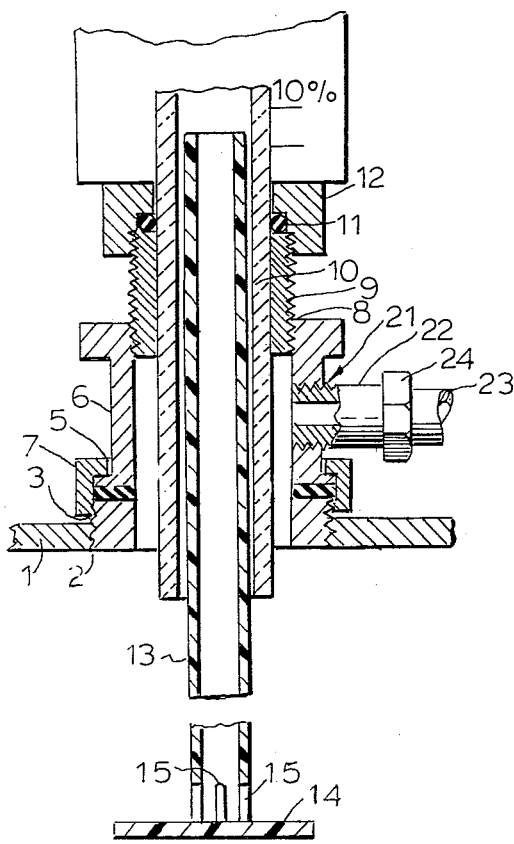
FIG.2
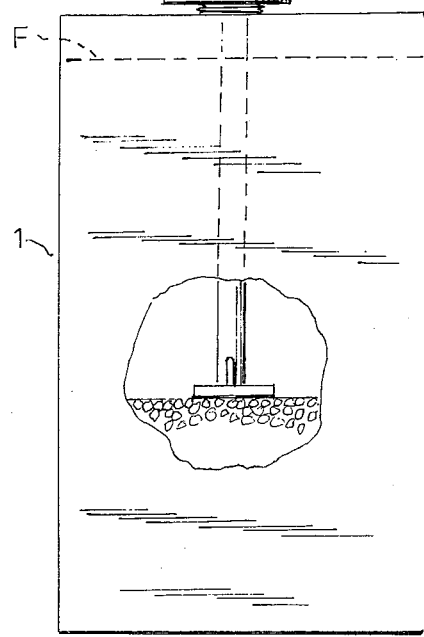

SOLIDS LEVEL INDICATOR

BACKGROUND OF THE INVENTION

The present invention relates to sensors for the levels of solids in vessels and is concerned, more particularly, with sensors for indicating the levels of soluble solids in dissolving tanks.

BRIEF DISCUSSION OF THE PRIOR ART

A wide variety of attempts have been made in the area of sensing and signalling or indicating the level of changeable solids contents in enclosed vessels or tanks.

These have included mechanical, pneumatic, electrical, electromechanical and radiant-energy units which, in some cases, have been quite successful for specific services and types of vessels.

However, these units have necessarily involved a considerable degree of sophistication and cost that is quite unsuitable for relatively small installations.

The problem becomes even more acute in the very small installations, in which cases the cost of sophisticated sensors and indicators could approach, equal or even exceed the cost of the equipment to which they are applied.

This last category is typified by the so-called "home" size water-conditioners where dissolving and metering of small amounts of chemicals are required.

In such services as the chlorination of wells and chemical stabilization of dissolved iron compounds, and analogous services, it is usual to provide for a minor, branched flow of water into an enclosed, pressurized vessel containing the appropriate chemical agent to be dissolved and reintroduced to the system, whether the introduction point be upstream or downstream of the pump.

In such units, loss of the supply of the solids could result in delivery of unsafe drinking water or an untreated water which can deposit upon, or chemically attack, the system in which it is delivered.

This possibility is made even more likely by the fact that this type of "home" water conditioner is usually not attended by a professional, but is only sporadically tended to by the home-owner, restaurant owner or small businessman using the equipment.

Prior attempts at accommodating these problems have generally fallen into three categories, including electromechanical alarm systems, timed refilling of the solids and periodic chemical analysis of the treated effluent by the use of convenient test kits which signal the existence of low treatment levels, usually after the solids are depleted. Electromechanical systems are costly. Neither service-approach is safe unless frequently applied, since the rate of usage can vary, to defeat the adequacy of the periodic refilling approach, while the test-kit approach usually gives a warning after loss of the adequate solids content.

The extreme of forming the solids-dissolving container entirely of a transparent material, through which the solids are visible, has been tried but has added servicing problems and high tank-failure rates because of the resultant fragility of the vessel structure. Consequently, none of the prior attempts at sensing or indicating solids levels in closed vessels have been found to be entirely satisfactory.

SUMMARY OF THE INVENTION

In general, the preferred form of sensor and indicator of the present invention comprises a transparent, hollow tube mounted in sealed relationship with an aperture in an upper portion of a vessel, an elongated member of a diameter sufficiently smaller than the interior of the hollow tube to reciprocate freely therein, and a solids-engaging surface on the elongated gauge member to support the elongated member upon the upper surface of the solids in the vessel. Preferably, the hollow tube is connected as the inlet duct for untreated solvent-liquid and the elongated gauge member includes liquid-guiding means to direct the incoming liquid flow downward to the surface of the solute solids.

OBJECTS OF THE INVENTION

Accordingly, it is an object of the present invention to provide a simple and reliable indicator for showing changing solids-levels in enclosed, liquid tanks.

It is a further object of the present invention to provide a simple and reliable, solely mechanical, indicator changing of solids-levels in enclosed, liquid tanks.

It is a still further object of the present invention to provide a simple and reliable, mechanical indicator of changing solid solute levels in closed dissolving tanks which are non-transparent and are installed in closed systems.

Another object of the present invention is the provision of a simple and reliable mechanical indicator of solids levels in dissolving tanks which serves to guide the flow of the solving liquid.

A further object of the invention is the provision of a simple and reliable indicator of solids levels in dissolving tanks which serves to guide the flow of solving liquid toward the exposed surface of the solute solids.

A still further object of the present invention is the provision of a simple and reliable indicator of the solids level in dissolving tanks which serves to guide a major portion of the solving liquid flow toward the exposed surface of the solute solids.

A particular object of the present invention is the provision of a simple and reliable indicator of solids levels in dissolving tanks which serves to conduct a major portion of the solving liquid flow to a zone adjacent the exposed surface of the solute solids.

A further particular object of the present invention is the provision of a simple and reliable indicator of solids levels in dissolving tanks which serves to conduct a major portion of the solving liquid flow to a zone adjacent the exposed surface of the solute solids and to distribute the liquid flow across the exposed surface.

A still further and particular object of the present invention is the provision of a simple and reliable indicator of solids levels in dissolving tanks which is removably mounted at the liquid inlet of the tank so as to be self-setting after filling of the tank with solids.

It is a still further and particular object of the present invention to provide a simple and reliable indicator of solids levels in dissolving tanks which is removably associated with a combined inlet and outlet aperture in the tank and which serves to conduct the major portion of the solvent liquid flow for distribution adjacent the exposed surface of the solute solid and deterring short-circuiting of the solvent liquid to the solution outlet.

BRIEF DESCRIPTION OF THE DRAWINGS

The foregoing and additional objects of the present invention will be more fully understood from the following description of the preferred embodiment and the accompanying drawings, in which:

FIG. 1 is a side view, partly cut away, of the preferred form of indicator for a dissolving tank;

FIG. 2 is an enlarged sectional view of a portion of FIG. 1; and

FIG. 3 is a cross-sectional view of a modified form of solids-engaging member.

DETAILED DESCRIPTION OF PREFERRED EMBODIMENT

As shown in FIGS. 1 and 2, the preferred form of indicator of the invention is mounted on a dissolving tank 1 by means of a threaded aperture 2, in the top wall of the tank, which carries a threaded nipple 3 therein.

The protruding portion of the nipple 3 receives a gasket 4 which, in turn, engages a flange 5 of a quick change connector 6 which engages the nipple 3 by means of a threaded collar 7 which is freely rotatable on the connector to draw the flange 5 toward the nipple 3, thereby forming a seal at the gasket 4.

The upper portion of the hollow connector 6 has a threaded opening 8 which carries a threaded nipple 9. The nipple 9 mounts a transparent inlet duct 10, which closely fits the interior diameter of the nipple, by means of an O-ring 11 which is compressed by a threaded collar 12 and thus distorted into frictional and sealing engagement with the inlet duct.

The inlet duct preferably is rigid or relatively inflexible and may be formed of heavy glass or stiff plastic tubing or pipe and should be of a length at least equal to the maximum, designed-variation in the solids-level in the vessel.

It is to be understood that the particular quick-connector form shown is representative and that any form of quick detachable connector may be employed as long as it includes means for securing the inlet duct in a fixed position aligned with the aperture 2. Preferably, the aperture 2 is of substantial diameter, as discussed more fully hereinafter.

The inlet duct 10 has elongated member in the form of a hollow gauge pipe 13 which has a hollow outside diameter sufficiently smaller than the internal diameter of the inlet duct 10 to permit free sliding or telescoping of the two. At its lower end, the gauge pipe 13 is closed by a perpendicular disc 14 and is provided with a plurality of radial, lateral apertures 15 adjacent the upper surface of the disc. The disc may be secured on the gauge tube by any suitable means such as mechanically or by fusing or cementing, depending upon the materials of construction, and, most advantageously, is smaller than the bore of the nipple 3.

It is preferred that the inlet duct 10 be mounted substantially vertically so that the disc 14 is generally parallel to the average plane of solids in the tank, although moderate variation from the vertical will not defeat the operation of the indicator assembly.

Preferably, the gauge tube 13 is made relatively opaque by being marked or being formed of a distinct color which is readily visible through the transparent inlet duct 10. Also, the gauge tube 13 necessarily is sufficiently long to protrude from the tank and maintain telescoping relationship with the inlet duct 10, within the full designed range of changing solute-solids levels so that a selected portion of the gauge member is visible through the duct.

Suitable indicia are advantageous as a reference or guide to the proportion of solids, between "full" and "empty." This may take any desired form, such as marks applied directly upon the inlet duct or the form shown, which includes a scale 16 having 0–100% index markings 17 and which is mounted on the inlet duct 10 by wire clips 18 and which rests on the collar 12 to give a relatively fixed reference point with regard to the top wall of the tank 1 and, therefore, the range of solids levels within the tank.

At its upper end, the inlet duct is connected to a source (not shown) of solvent liquid, such as water, via a flexible tube or hose 19 which is secured thereon by any suitable means such as a clamp 20.

It is advantageous, where an outlet in the upper portion of the tank is preferred, to position the outlet as a component of the indicator assembly. As shown, the connector 6 has a threaded outlet bore 21 having a fitting 22 therein to which is secured a flexible outlet line 23 by means of a connector 24.

OPERATION OF THE PREFERRED EMBODIMENT

In operation of the indicator of FIGS. 1 and 2, the tank 1 is filled, such as to the dotted line "F", through the aperture 2 via nipple 3. As stated hereinbefore, it is advantageous to form aperture 2 of a substantial diameter, and greater than the diameter of the disc 14 both to facilitate loading of solids and to provide for ease of assembly of the indicator with the tank. It is to be understood, however, that solids-loading may be effected via a different opening in the tank.

When the tank is filled with solids, the indicator assembly is attached, via the collar 7, with the disc 14 resting on the solids and the gauge tube 13 telescoped well up in the inlet duct 10, such as at the 100% mark, generally represented by the dotted lines $f$.

Solvent liquid entering through the inlet duct 10 passes within the gauge tube 13 and emerges in a distributed pattern radially from the apertures 15 adjacent the upper surface of the disc 14. The liquid thus sweeps across the exposed surface of the solids for optimum surface-area contact therewith.

As the solids-level gradually recedes as a result of dissolving in the liquid transversing the tank, gravity tends to pull the gauge tube 13 downwardly to maintain the disc 14 in contact with the receding solids level. In addition, the fluid pressure directed within the gauge tube 13, downwardly against the disc 14, tends to press the disc downwardly and to maintain its lower supporting surface in firm contact with the solids. This effect must be limited, however, such as by sizing of the apertures 15 and leakage between the tubes 10 and 13, to avoid a full hydraulic-piston effect which might cause the disc and gauge tube to be progressively buried below the upper solids level.

When the supply of solids has been depleted sufficiently to provoke re-filling, the dissolving system is isolated, such as by shutoff valves (not shown) and the collar 7 is loosened out of threaded engagement with the nipple 3. The connector 6 is then lifted clear of the tank and the two are separated sufficiently to permit removal of the protruding gauge tube 13 and the support disc 14, via the nipple 3.

When the tank has been refilled or, as the case may be, replaced by an already filled tank, the gauge tube 13 is reinserted; the indicator assembly is reconnected by means of the collar 7, and the system is again put on stream. The gauge tube 13 is again supported by the disc on the upper surface of the solids and again gradually descends as the solids are dissolved, until a low level is reached and again provokes refilling.

Since the gauge tube 13 protrudes from the tank at its lowest position, it is readily removed with the rest of the indicator assembly and is, therefore, self-setting when reintroduced into a tank which is full of solids.

The gauge tube 13 is quite effective in conducting a major portion of the incoming liquid toward and across the exposed material to avoid short-circuit of liquid to the outlet without exposure to the solute. The indicator assembly, therefore, not only senses and indicates the invisible changing solids levels in the tank, but also actually serves to enhance the dissolving of the solids in the solvent liquid.

A cross section of a modified form of gauge-member is shown in FIG. 3 and includes an elongated member 13' having a disc 14' attached at its lower end. The elongated member is cross-shaped, cruciform in section, with radial longitudinal ribs or arms 25 being separated by longitudinal grooves 26 which extend the length of the gauge member 13'.

The outer edges 27 of the arms 25 are symetrically arranged so that they serve as guides within their associated inlet duct.

In use, the gauge member of FIG. 3 functions in a manner generally similar to the gauge duct 13 of FIG. 1. However, instead of conducting the incoming liquid downwardly toward the disc 14' and the adjacent solids, the grooves 26 serve as guides to the liquid which tend to direct the liquid therealong with a "wall effect" tending to continue the incoming liquid in the original alignment or direction longitudinally of the indicator assembly. Therefore, any tendency of the liquid to short-circuit toward the outlet, without contact with the solids, is substantially avoided.

With the indicator assembly providing both an inlet and outlet for the tank, as well as an indication of the solids-content thereof, refilling or exchanging of tanks is greatly simplified, with only one tank connection being required.

Therefore, it is apparent that the present invention provides a particularly advantageous indicator which is simple, reliable and sufficiently economical to permit its widespread use, especially in small and moderate-sized systems.

Various changes may be made in the details of the invention, as disclosed, without sacrificing the advantages thereof or departing from the scope of the appended claims.

I claim:

1. Apparatus for indicating levels of dissolvable solids in a closed vessel through which liquid circulates, said apparatus comprising:

a substantially transparent duct having open top and bottom ends wherein the bottom end registers with the vessel and the top end is an inlet for introducing liquid into the vessel;

an elongated gauge member telescopically mounted in said duct for reciprocation therein, said elongated gauge member projecting beyond the bottom end of said duct and into said vessel and being provided with a solid foot which rests on said solids while the fluid circulates, means for conveying the liquid from the inlet and over the foot to hold the foot in engagement with the solids, wherein the level of the solids in the vessel controls the height of the gauge in the duct and wherein a selected portion of the gauge member is visible through the duct thereby indicating the level of solids in the vessel;

mounting means for coupling said apparatus to the vessel, said mounting means including an annular connector through which the duct member extends, said annular connector having a diameter greater than the duct member, so that there is an annular space between the annular connector and the duct member which registers with the vessel, and an outlet through the annular connector wherein liquid in the vessel exits from the vessel through the outlet as the liquid dissolves the solids.

2. The apparatus of claim 1 wherein the means for conveying the liquid includes a bore through the gauge and a plurality of aperatures adjacent the foot wherein liquid flows through the bore and emerges adjacent the foot to apply pressure to the foot.

3. The apparatus of claim 1 wherein the gauge means has a cruciform cross-section which comprises the means for conveying the liquid to the foot.

4. The apparatus of claim 1 wherein a gauge is disposed adjacent the transparent duct and the level of the solids in the vessel is read by comparing the height of said selected portion of the gauge member with indicia on the gauge member.

5. The apparatus of claim 1 wherein the liquid is water and the solids are dissolved in the water to condition the water.

* * * * *